United States Patent
Squyres

(10) Patent No.: US 9,393,896 B1
(45) Date of Patent: *Jul. 19, 2016

(54) CARGO DECKING BEAM END

(71) Applicant: Jerrell P. Squyres, Point, TX (US)

(72) Inventor: Jerrell P. Squyres, Point, TX (US)

(73) Assignee: B2B Casuals, Inc., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/704,258

(22) Filed: May 5, 2015

Related U.S. Application Data

(63) Continuation-in-part of application No. 14/522,069, filed on Oct. 23, 2014, now Pat. No. 9,090,192.

(51) Int. Cl.
  *B60P 7/08* (2006.01)
  *B60P 7/15* (2006.01)

(52) U.S. Cl.
  CPC .......................................... *B60P 7/15* (2013.01)

(58) Field of Classification Search
  CPC ............................................................ B60P 7/15
  USPC ........... 410/89, 143, 144, 145, 146, 147, 148, 410/149, 150
  See application file for complete search history.

(56) References Cited

U.S. PATENT DOCUMENTS

| | | | |
|---|---|---|---|
| 5,338,137 A | 8/1994 | Jensen | |
| 5,941,667 A * | 8/1999 | Hardison | B60P 7/15 410/143 |
| 6,074,143 A | 6/2000 | Langston et al. | |
| 6,364,583 B1 | 4/2002 | Koller | |
| 6,895,867 B1 | 5/2005 | Burrows | |
| 7,578,644 B2 * | 8/2009 | Squyres | B60P 7/15 410/143 |
| 8,172,494 B1 | 5/2012 | Knox | |
| 8,740,526 B2 | 6/2014 | Knox | |
| 8,757,944 B2 | 6/2014 | Calico | |
| 8,820,008 B2 | 9/2014 | Knox | |
| 9,090,192 B2 * | 7/2015 | Squyres | B60P 7/15 410/143 |

* cited by examiner

*Primary Examiner* — Stephen Gordon
(74) *Attorney, Agent, or Firm* — Ross IP Group PLLC; Christopher P. O'Hagan

(57) ABSTRACT

The present invention provides an end assembly for use with cargo decking beams. The end assembly comprises a body formed from C-shaped plates coupled back-to-back that is slidably disposed within the end of a decking beam. A latch mechanism at one end of the body includes an end tab formed from the plates that fits into openings (either A or E slots) in a mounting track. A retaining lip on the bottom engages the openings and a notch in the top provides room for the lip to be inserted and lifted out of the openings. An internal swivel latch fills the space left by the notch when in a closed position to prevent the retaining lip from lifting out of the openings.

6 Claims, 9 Drawing Sheets

CARGO DECKING BEAM END

CROSS-REFERENCE TO RELATED APPLICATIONS

This application is a continuation-in-part of U.S. patent application Ser. No. 14/522,069, filed Oct. 23, 1014, and issued as U.S. Pat. No. 9,090,192, the technical disclosure of which is hereby incorporated by reference.

TECHNICAL FIELD

The present invention relates generally to the field of cargo containers and more specifically to a system of adjustable load beams that provide decking to divide the cargo container into multiple levels of payload.

BACKGROUND OF THE INVENTION

In freight transportation it is often desirable to stack cargo in multiple levels to take full advantage of the available height of containers such as truck trailers, aircraft, railroad cars, and other similar cargo containers. To facilitate this process it is common practice to employ removable decking beams capable of supporting the weight of heavy payloads.

Typically such decking beams are adjustable, allowing them to be repositioned within a cargo container at various heights and horizontal intervals, depending on the size and nature of the cargo.

FIG. 1 illustrates a typical cargo beam and decking system in accordance with the prior art. FIG. 1 is a cut-away perspective view of a truck trailer containing two rows and stacks of cargo pallets. As shown, a series of vertical mounting tracks 10 line the walls along the length of the cargo container. Each of the mounting tracks 10 includes a series of openings for adjusting the height of the decking beams. In the present example four decking beams 20 span the width of the trailer, providing support for the top layer of cargo pallets 30.

FIG. 2 is a side view of an adjustable decking beam in accordance with the prior art. The beam 40 comprises a central section 50 that is hollow and two adjustable end pieces 60, 70 that are slidably disposed within the ends of the beam. Each end piece further comprises a "foot" 65, 75 that can be slidably disposed along the vertical mounting tracks shown in FIG. 1.

The feet have trigger, locking mechanisms 80 that engage and disengage with the openings in the mounting tracks, thereby allowing the beams to be locked into place at different heights, according to the needs of the user.

Most current models support the beam with two outside pieces with the trigger mechanism enclosed in the middle. However, once the outside pieces are bent, the enclosed trigger mechanism becomes inoperative, and the beam is out of service. Similarly, some prior art designs use outside trigger mechanisms, which encounter the same problem. They are easily bent, putting the whole beam out of service.

Therefore, there is a need in the freight industry for a more robust decking beam system that is more resilient to damage from the often rough conditions of loading and unloading heavy cargo.

SUMMARY OF THE INVENTION

The present invention provides an end assembly for use with cargo decking beams. The end assembly comprises a body formed from C-shaped plates coupled back-to-back that is slidably disposed within the end of a decking beam. A latch mechanism at one end of the body includes an end tab formed from the plates that fits into openings in a mounting track. The end tab can fit into either industry standard A or E slots on the mounting post.

A retaining lip on the bottom of the end tab engages the openings and a notch in the top provides room for the lip to be inserted and lifted out of the openings. An internal swivel latch fills the space left by the notch when in a closed position to prevent the retaining lip from lifting out of the openings. By default, the swivel latch is held in closed position by a return spring. An internal spacing plate between the C-shaped outer plates defines a movement path for the swivel latch between closed and open position and includes a recess for holding the return spring.

Opposing outer holes in the plates and a hole in the swivel latch align when the swivel latch is in the closed position, allowing a lock to be inserted through them to keep the swivel latch locked closed.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

The present invention provides an adjustable cargo decking beam system that is very resistant to damage from impact by heavy cargo loads and can be replaced in modular fashion in the unlikely event of such damage, thereby reducing operating costs.

Figure 3:
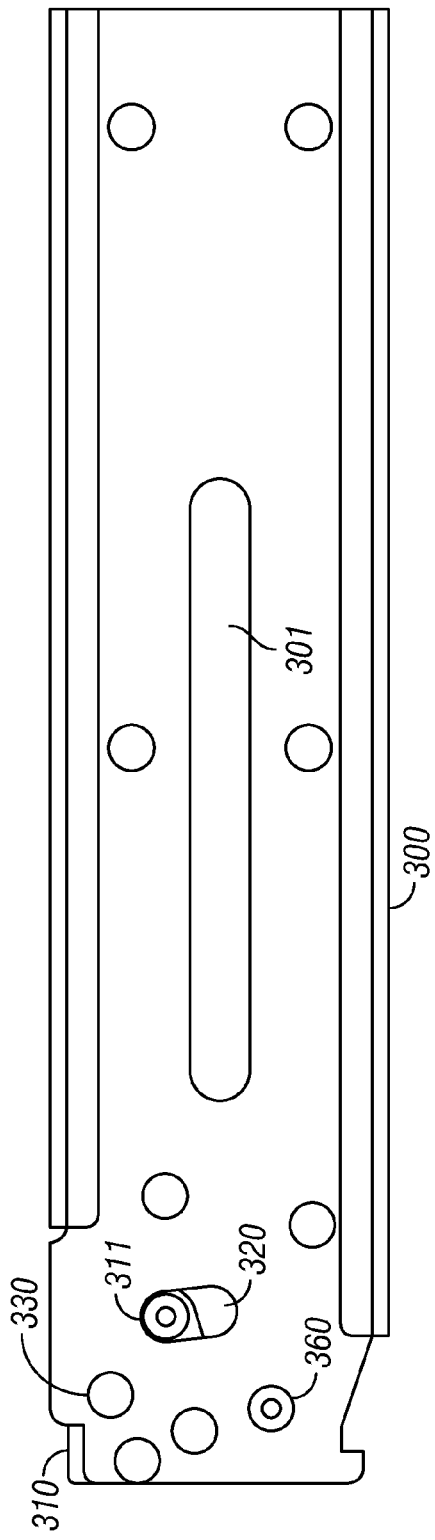
FIG. 3 is a side view of a beam end in accordance with a preferred embodiment of the present invention.

FIG. 3 is a side view of a cargo beam end 300 in accordance with the present invention. It is sometimes referred to as a replacement channel assembly, beam head assembly, decking beam head, e beam end plug or simply the end piece. In one embodiment, the beam end comprises a steel insert that fits into an aluminum extrusion to complete the e beam, which locks into an e track on the side wall of a trailer or truck body (described below).

The beam end 300 is also telescopically disposed within the ends of a decking beam, employing adjustment slots 301. The latch mechanism comprises a tab formed from the back-to-back coupled plates 340, 350, which inserts directly into the openings in the mounting post (see FIG. 10). The swivel latch 310 mounted on the tab is operated by means of a pull handle 311 that extends through a slot 320 in the beam plate as shown. The latch can be locked in place by means of bullet lock holes 330 in the latch and beam plates that align when the latch is in the closed position (see FIG. 5).

Figure 4:
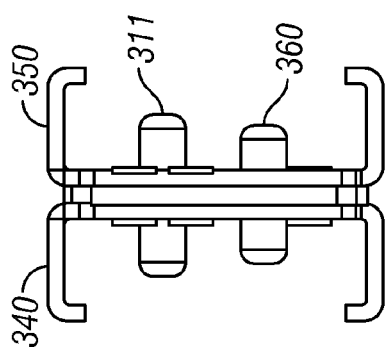
FIG. 4 is an end-on view of the beam end in accordance with the present invention.

FIG. 4 is an end-on view of the beam end. As shown two C-shaped beam plates 340, 350 are coupled back-to-back for increased mechanical reinforcement. The extension of track stops 360 from the center of the beam end control the depth of insertion into the slider post (see FIG. 9).

Figure 5:
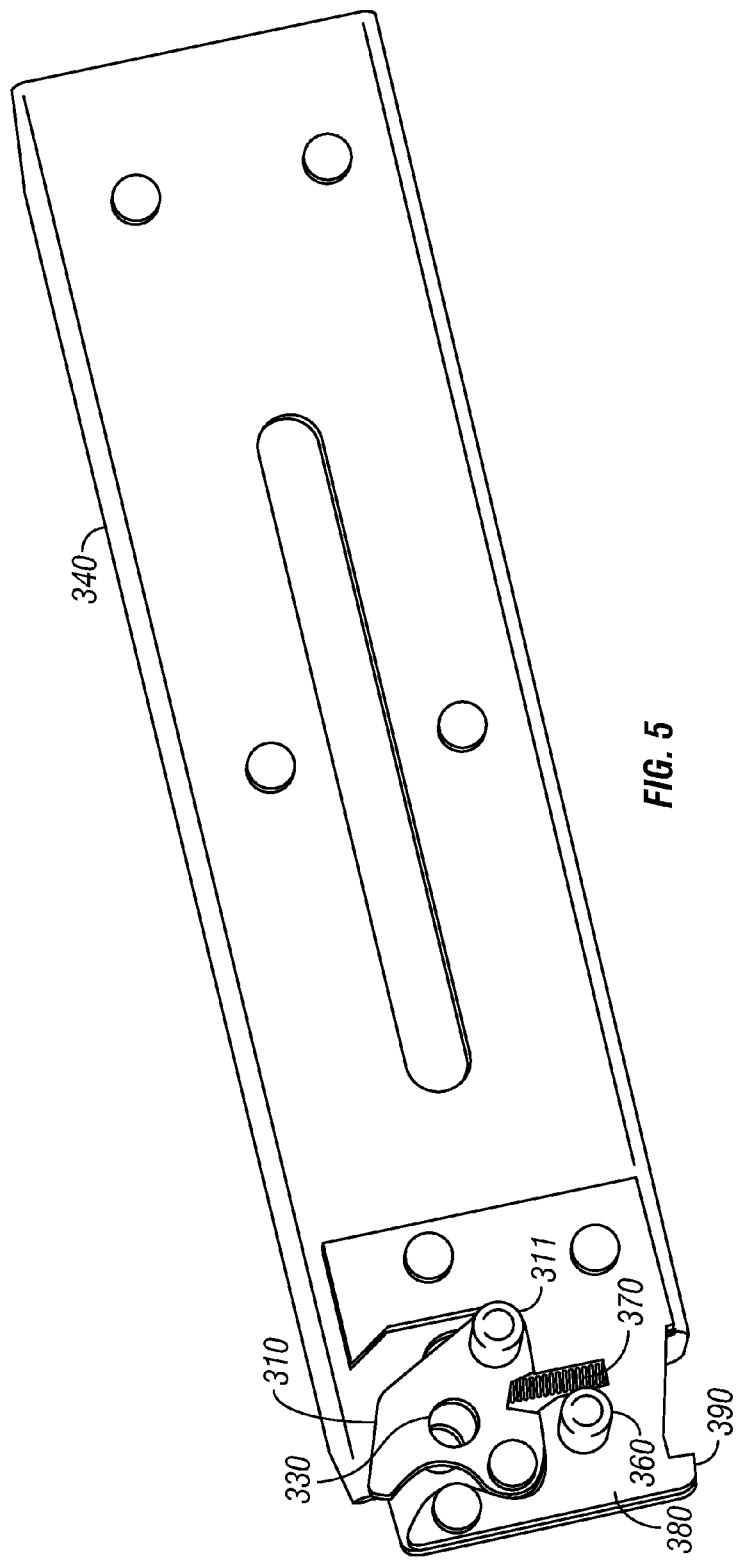
FIG. 5 is a side, cross-section view of the beam end in accordance with the present invention.

FIG. 5 is a side, cross-section view of the beam end in accordance with the present invention. This view more clearly shows the swivel latch 310 on the end tab that is sandwiched between the plates 340, 350. This figure illustrates the latch mechanism in the open position. By default the swivel latch 310 is held in the closed position by a return spring 370 recessed into the spacer plate 380. The spacer plate 380 defines the path of movement of the swivel latch 310 as shown.

Figure 10:
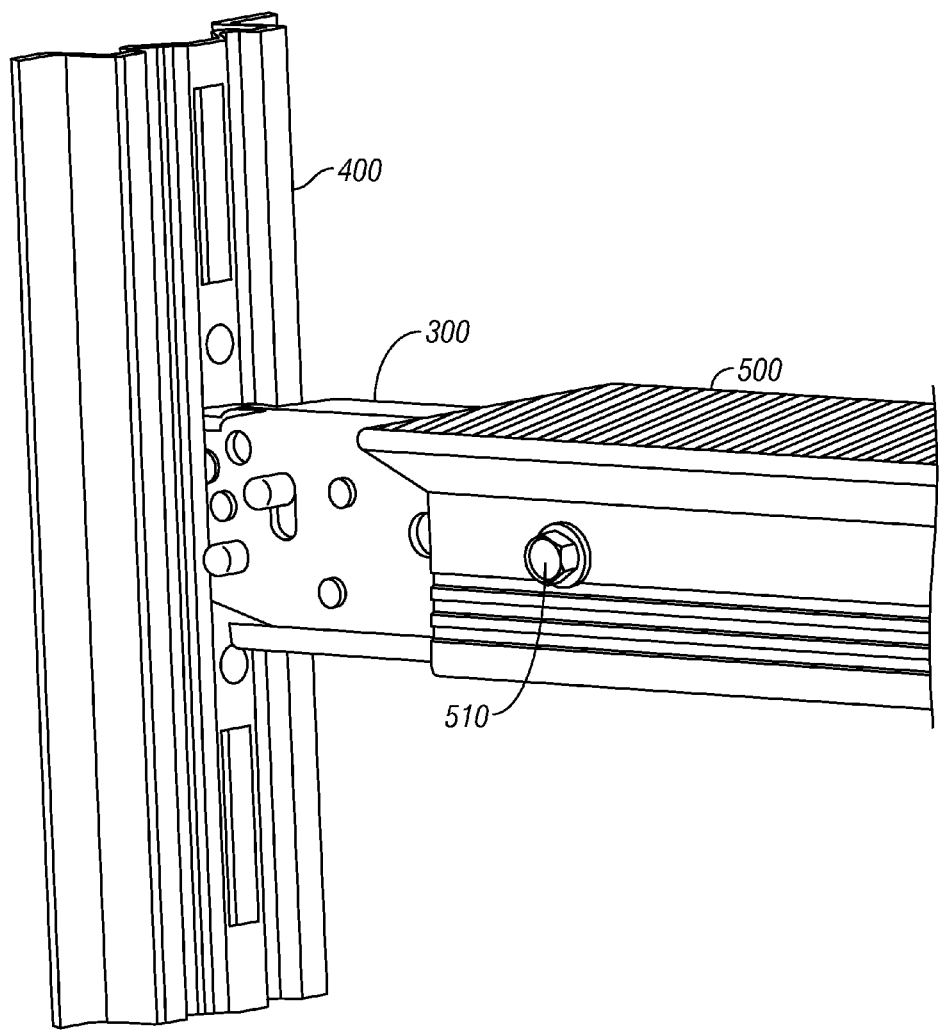
FIG. 10 is a perspective view of the beam end inserted into a mounting post insert in accordance with the present invention.

In the closed position, the beam end is held within an opening of the mounting post by means of a fixed lower retaining lip 390 formed at the bottom of the end tab and the swivel latch 310 at the top (see FIG. 10). As can be seen in the figure the spacing plate 380 of in the latch mechanism is also shaped to form part of the fixed retaining lip 390.

To open the latch, the user depresses the pull handle 311, compressing the return spring 370. When the pull handle 311 is depressed and the swivel latch 310 pulled into the open position a space is created at the top edge of the beam end, creating space to lift the lower retaining lip 390 up and out of the mounting post. When the latch is in the closed position the bullet lock holes 330 in the beam plate and swivel latch align, allowing a lock to be inserted to secure the latch.

Figure 6:
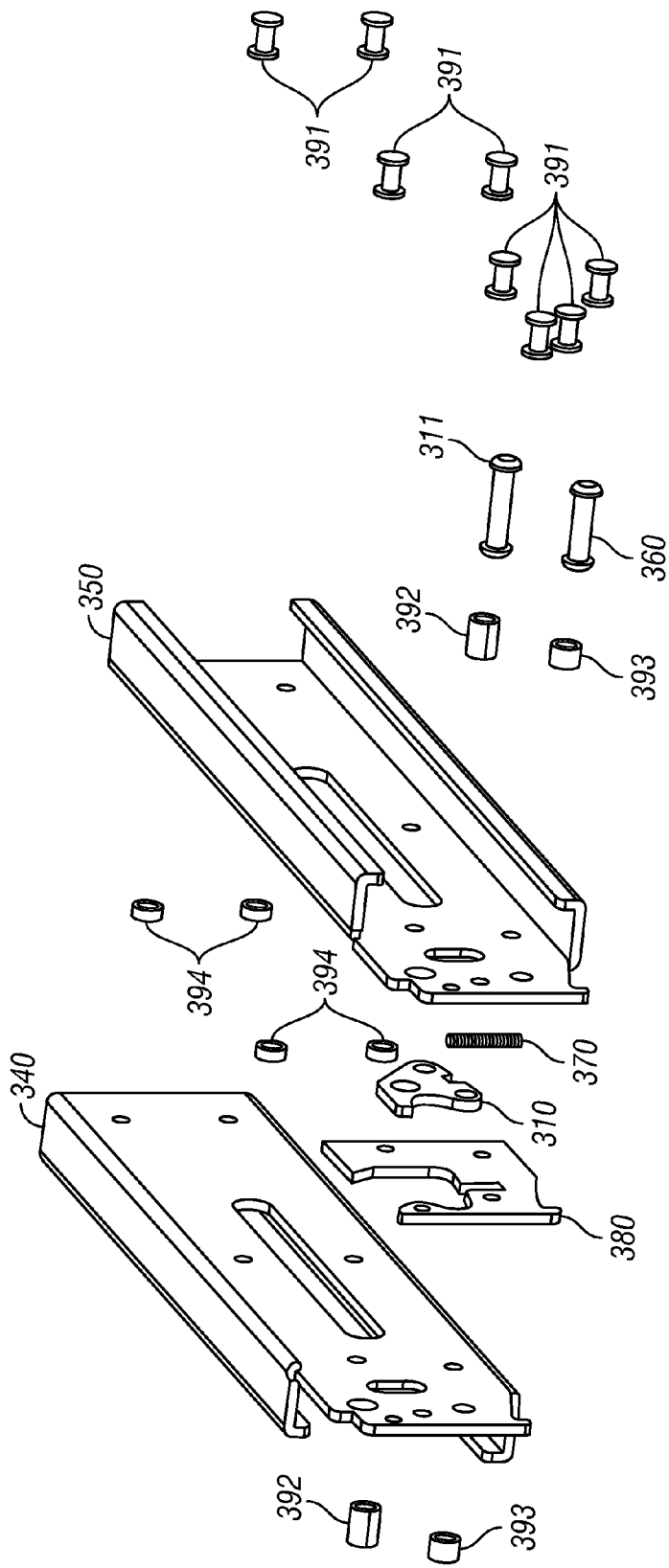
FIG. 6 is an exploded view of the beam end in accordance with the present invention.

FIG. 6 is an exploded view of the beam end in accordance with the present invention. In this example, the components of the beam end are held together by flat head rivets 391 as shown. Also shown are several types of spacers. On the outside of the plates are trigger pivot spacer tubes 392 that fit over the pull handle 311. Similarly, the beam track stop spacer tubes 393 fit over the track stops 360 on either side. Center beam spacers 394 are located between the plates 340, 350.

In addition to the mechanical strength provided by its design, the beam end 300 is constructed from steel. In contrast, most prior art beam systems are made of aluminum, making them more vulnerable to damage.

Figure 1:
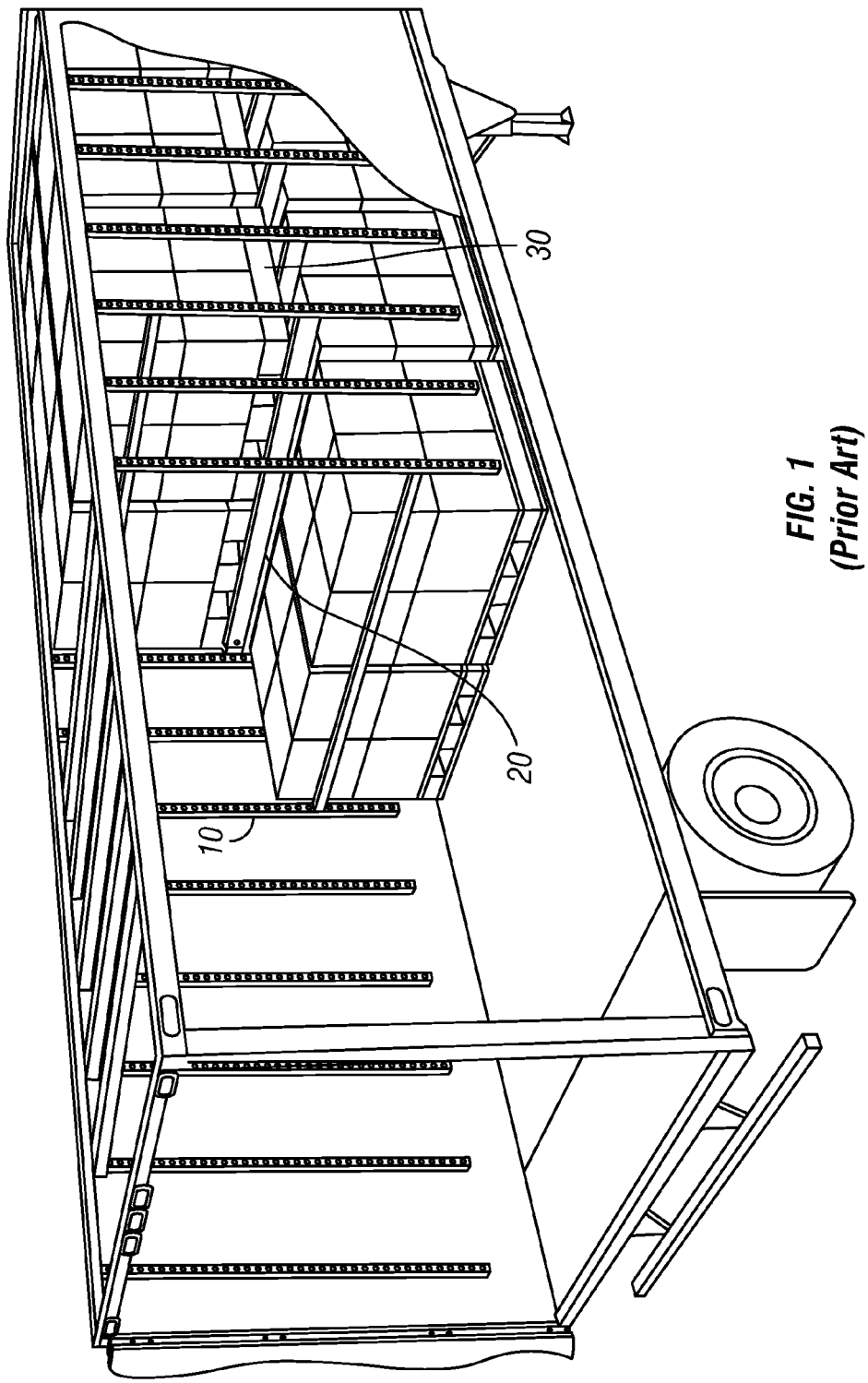
FIG. 1 is a cut-away perspective view of a truck trailer employing a cargo beam and decking system in accordance with the prior art.
Figure 2:
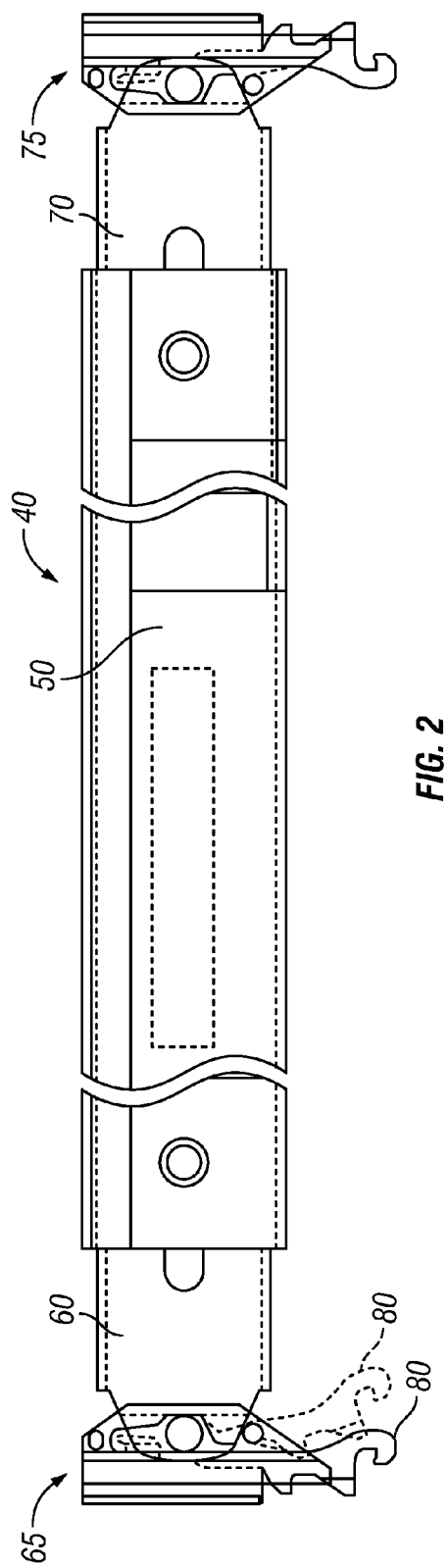
FIG. 2 is a side view of an adjustable decking beam in accordance with the prior art.
Figure 7:
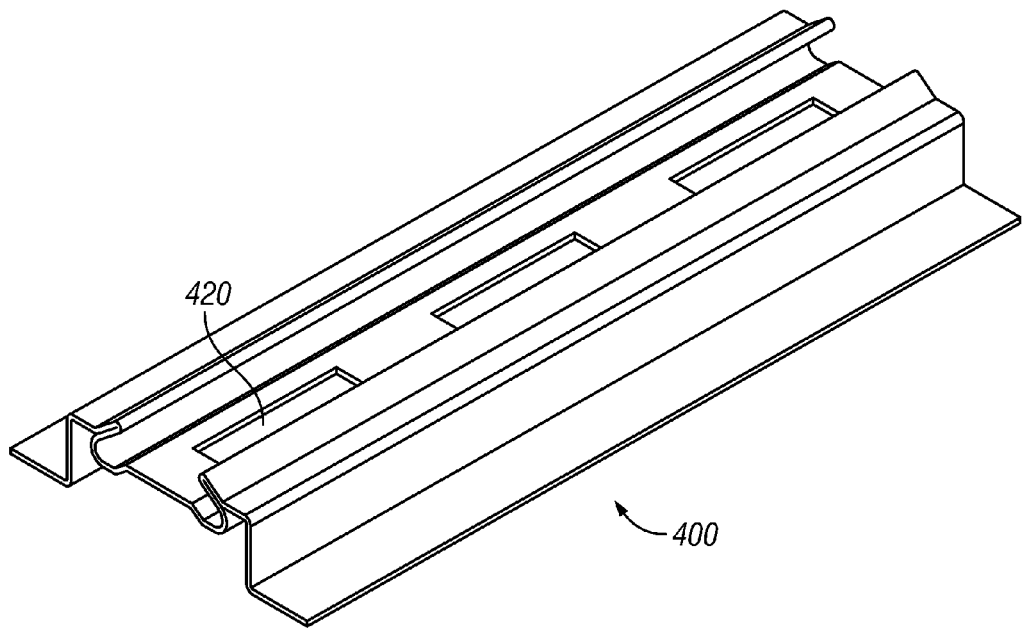
FIG. 7 is a perspective view of a mounting post in accordance with the present invention.
Figure 8:
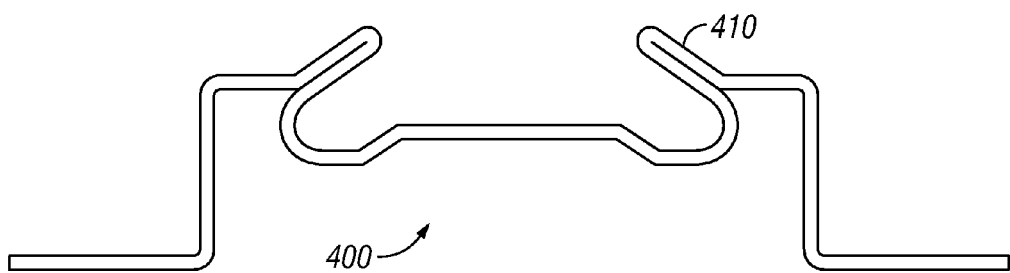
FIG. 8 is a cross-section view of the mounting post in accordance with the present invention.

FIG. 7 is a perspective view of a mounting post in accordance with an embodiment of the present invention. FIG. 8 is a cross-section view of the mounting post. Such posts would be mounted on opposite sides of the cargo container at regular intervals in a manner similar to that shown in FIG. 1. The mounting post 400 comprises a slider track with obliquely (non-orthogonally) angled retaining walls 410 that form symmetrical, obliquely-angled capture guide channels. In the center of the mounting post us a row of spaced openings 420 along its length in the form of "A" slots, a standard configuration used in shipping and freight industry. More specifically, the industry standard for an A slot is a rectangular opening with dimensions of approximately 5"×1.25" (12.7 cm×3.18 cm).

Figure 11:
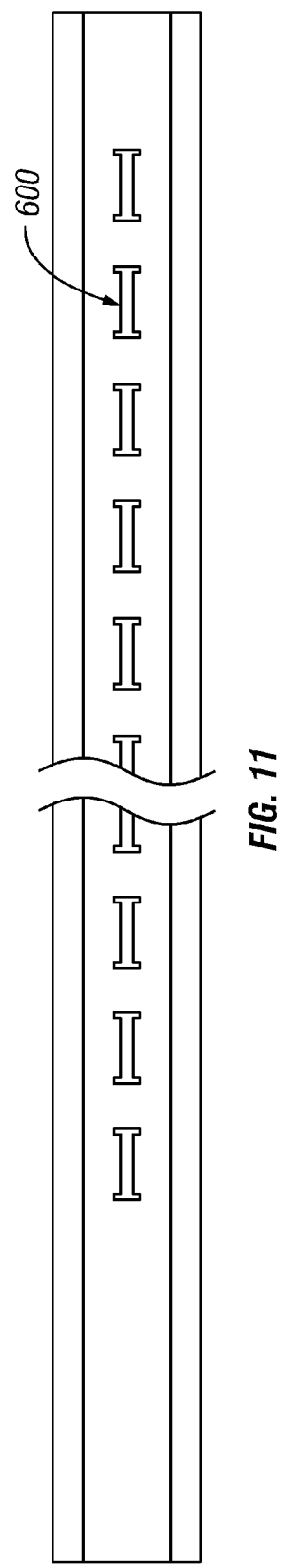
FIG. 11 is front view of a mounting post with industry standard E slots in accordance with the prior art.
Figure 12:
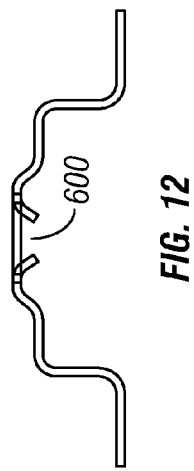
FIG. 12 is a top, cross-section view of an E slot in accordance with the prior art.

An alternative industry standard slot is the "E" slot shown in FIGS. 11 and 12. As shown in the figures, the E slot 600 has a roughly "dog bone" shape to it. The industry standard for the dimensions of an E slot is approximately 2.41" (6.12 cm) length, 0.5" (1.27 cm) narrow center width, and 0.56" (1.42 cm) end width. The majority of logistic posts used in the U.S. shipping industry today employ the A slot configuration, however E slots are not uncommon. For ease of presentation, the below example uses the A slots, but it should be emphasized the present invention can be implemented just as easily with either A or E slots in the mounting posts.

Figure 9:
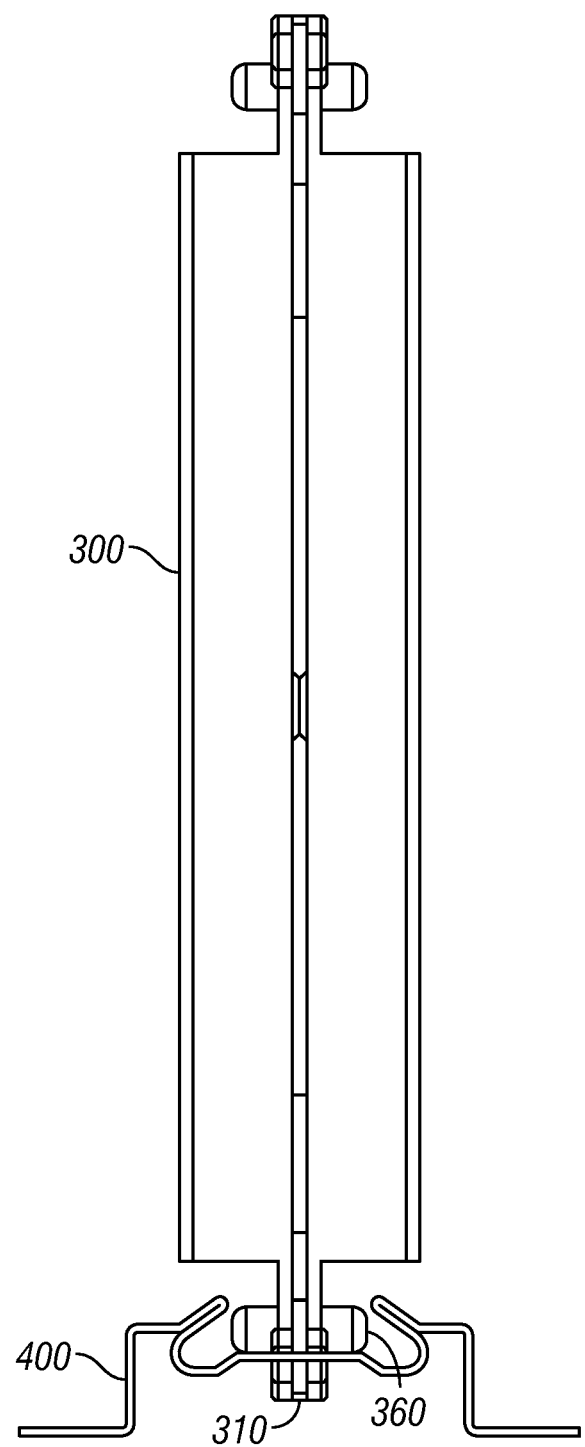
FIG. 9 is a cross-section view of the beam end inserted into the mounting post in accordance with the present invention.

FIG. 9 is a top, cross-section view of the beam end 300 inserted into the mounting post 400 in accordance with the present invention. The latch 310 of the beam end fits into the openings (either A or E slots) in the center track of the mounting post (see also FIG. 10). As show in FIG. 9, the track stops 360 extending outward from the beam plates control the depth of the insertion of the beam end into the openings in the mounting post 400. Additionally, the track stops 360 provide an opposing retaining force on the front side of the mounting post while the retaining lip of the latch mechanism provides a retaining force on the back side of the mounting post.

FIG. 10 is a perspective view of the beam end 300 inserted into the mounting post 400. The example shown depicts the beam end inserted into an A slot, but as mentioned above the beam end is equally compatible with an E slot. FIG. 10 also shows the beam end 300 inserted into a wide-top decking beam 500. A retaining bolt 510 in the decking beam fits through the adjustment slots 301 in the beam end 300 to hold it in place while also allowing it to be telescopically adjusted during mounting and dismounting from the logistic post 400.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A beam end assembly, comprising:
   (a) a body formed from two C-shaped plates coupled back-to-back, wherein said body is configured to be slidably disposed within the end of a beam member;
   (b) a latch mechanism at one end of the body further comprising:
      (i) an end tab formed from back sections of said C-shaped plates and extending axially beyond flanged sections of said plates, wherein said tab is configured to fit into openings in a mounting post, and wherein said tab includes a retaining lip on a bottom surface configured to engage said mounting post and a notch in a top surface to provide room for the retaining lip to be inserted into and lifted out of said openings; and
      (ii) an internal swivel latch sandwiched between said plates, wherein the swivel latch fills a vertical space left by said notch when in a closed position, thereby providing a retaining force to prevent the retaining lip from lifting out of the openings;
   (c) opposing holes in said plates and a hole in the swivel latch, wherein all of said holes align when the swivel latch is in the closed position to allow a lock to be inserted through them to hold the swivel latch in the closed position; and (d) at least one stopper pin extending from a side of the beam end assembly to limit insertion depth into a mounting post.

2. The beam end assembly according to claim 1, wherein the swivel latch is held in the closed position by default by a return spring.

3. The beam end assembly according to claim 1, wherein the latch mechanism further comprises a slot in at least one of the plates and at least one pull handle extending from a side of the swivel latch, wherein the pull handle is configured to protrude through said slot to enable moving the swivel latch between closed and open positions.

4. The beam end assembly according to claim 1, wherein the latch mechanism further comprises a spacer plate between the plates that form the body, wherein the spacer plate defines a movement path for the swivel latch between a closed and open position.

5. The beam end assembly according to claim 4, wherein the spacer plate further comprises a recess holding a return spring that acts upon the swivel latch.

6. The beam end assembly according to claim 1, wherein the end tab is configured to fit within both "A" and "E" openings in mounting posts.

* * * * *